United States Patent
Saniei et al.

(10) Patent No.: US 12,145,343 B2
(45) Date of Patent: *Nov. 19, 2024

(54) LIGHTWEIGHT POLYETHYLENE FILM FOR ASEPTIC PACKAGING APPLICATIONS AND THE PRODUCT RESULTING THEREFROM AND THE PROCESS OF MAKING THE SAME

(71) Applicant: MuCell Extrusion, LLC, Woburn, MA (US)

(72) Inventors: Mehdi Saniei, Belmont, MA (US); Mark E. Lindenfelzer, Milton, MA (US); Eric V. Fredrickson, Lancaster, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,748

(22) Filed: Jul. 1, 2022

(65) Prior Publication Data

US 2023/0130761 A1 Apr. 27, 2023

Related U.S. Application Data

(63) Continuation of application No. 16/875,198, filed on May 15, 2020, now Pat. No. 11,376,823.

(Continued)

(51) Int. Cl.
| | |
|---|---|
| *B32B 27/06* | (2006.01) |
| *B29C 48/00* | (2019.01) |
| *B29C 48/10* | (2019.01) |
| *B29C 48/21* | (2019.01) |
| *B29K 23/00* | (2006.01) |
| *B29K 105/04* | (2006.01) |
| *B29L 23/00* | (2006.01) |
| *B32B 1/08* | (2006.01) |
| *B32B 5/20* | (2006.01) |
| *B32B 27/08* | (2006.01) |

(Continued)

(52) U.S. Cl.
CPC ........ *B32B 27/065* (2013.01); *B29C 48/0018* (2019.02); *B29C 48/022* (2019.02); *B29C 48/10* (2019.02); *B29C 48/21* (2019.02); *B32B 1/08* (2013.01); *B32B 5/20* (2013.01); *B32B 27/08* (2013.01); *B32B 27/20* (2013.01); *B32B 27/306* (2013.01); *B32B 27/32* (2013.01); *C08J 5/18* (2013.01); *B29K 2023/065* (2013.01); *B29K 2023/086* (2013.01); *B29K 2105/04* (2013.01); *B29L 2023/001* (2013.01); *B32B 2250/03* (2013.01); *B32B 2250/05* (2013.01); *B32B 2266/025* (2013.01); *B32B 2266/08* (2013.01); *B32B 2307/72* (2013.01); *B32B 2307/7246* (2013.01); *B32B 2439/70* (2013.01); *C08J 2323/06* (2013.01); *C08J 2329/04* (2013.01)

(58) Field of Classification Search
CPC .......... B32B 27/065; B32B 1/08; B32B 5/20; B32B 27/08; B32B 27/20; B32B 27/306; B32B 27/32; B32B 2250/03; B32B 2250/05; B32B 2266/025; B32B 2266/08; B32B 2307/72; B32B 2307/7246; B32B 2439/70; B29C 48/0018; B29C 48/022; B29C 48/10; B29C 48/21; C08J 5/18; C08J 2323/06; C08J 2329/04; B29K 2023/065; B29K 2023/086; B29K 2105/04

See application file for complete search history.

(56) References Cited

U.S. PATENT DOCUMENTS

| | | | |
|---|---|---|---|
| 3,619,344 | A | 11/1971 | Wolinski |
| 4,713,273 | A | 12/1987 | Freedman |

(Continued)

FOREIGN PATENT DOCUMENTS

| | | |
|---|---|---|
| CA | 2685260 A1 | 11/2008 |
| CN | 108749241 A | 11/2018 |

(Continued)

OTHER PUBLICATIONS

International Search Report and Written Opinion for International Application No. PCT/US2020/033140 mailed Aug. 4, 2020.

(Continued)

*Primary Examiner* — Michael C Miggins
(74) *Attorney, Agent, or Firm* — Wolf, Greenfield & Sacks, P.C.

(57) ABSTRACT

A multilayer foam film comprising high density polyethylene for direct and non-direct food contact and aseptic packaging application is disclosed. In an embodiment, the film has a bulk density of less than 0.962 gr/cm³ wherein more than 50% of the cells in the foam layer are closed cells. In an embodiment, the foam films are thick (generally more than 8 mils thick) and have a bending stiffness value of more than 18, in Taber stiffness unit configuration according to TAPPI/ANSI T 489 om-15, and the ratio of the mass per unit area (the mass of a unit area of the film in gram per meter-squared (gr/m²)) over the stiffness value in Taber unit configuration is equal to or less than 13. In an embodiment, the film has a very smooth surface with a smoothness value of less than 25 in Sheffiled smoothness unit configuration according to TAPPI T 538. The described foam film can have a water vapor transmission rate value of less than 1 gr/m²/24 hr, according to ASTM E398-13. The described foam film can have an oxygen transmission rate value of less than 10 cc/m²/24 hr, according to ASTM D3985.

20 Claims, No Drawings

Related U.S. Application Data

(60) Provisional application No. 62/849,329, filed on May 17, 2019.

(51) Int. Cl.
    *B32B 27/20*     (2006.01)
    *B32B 27/30*     (2006.01)
    *B32B 27/32*     (2006.01)
    *C08J 5/18*     (2006.01)

(56) References Cited

U.S. PATENT DOCUMENTS

| | | | |
|---|---|---|---|
| 4,982,670 | A | 1/1991 | Zorn et al. |
| 5,128,196 | A | 7/1992 | Luetkens, Jr. et al. |
| 5,658,179 | A | 8/1997 | Glydon et al. |
| 5,712,026 | A | 1/1998 | Amagai et al. |
| 6,191,245 | B1 | 2/2001 | Campbell, Jr. et al. |
| 6,336,553 | B1 | 1/2002 | Gordon |
| 6,472,035 | B1 | 10/2002 | Al Ghatta et al. |
| 6,946,203 | B1 | 9/2005 | Lockhart et al. |
| 8,512,837 | B2 | 8/2013 | Barreneche |
| 8,871,286 | B2 | 10/2014 | Fritz |
| 8,901,260 | B2 | 12/2014 | Bafna et al. |
| 9,783,653 | B2 | 10/2017 | Igualada et al. |
| 10,011,697 | B2 | 7/2018 | Van der Ven et al. |
| 11,376,823 | B2 | 7/2022 | Saniei et al. |
| 2004/0091585 | A1 | 5/2004 | Theisen et al. |
| 2005/0287345 | A1 | 12/2005 | Tyler et al. |
| 2008/0202075 | A1 | 8/2008 | Kronawittleithner et al. |
| 2010/0215879 | A1 | 8/2010 | Dooley et al. |
| 2011/0027583 | A1 | 2/2011 | Lee et al. |
| 2011/0195165 | A1 | 8/2011 | Cahill |
| 2011/0300363 | A1 | 12/2011 | Enzinger et al. |
| 2012/0045603 | A1 | 2/2012 | Zerafati et al. |
| 2012/0228793 | A1 | 9/2012 | Lindenfelzer |
| 2013/0193164 | A1 | 8/2013 | Tom et al. |
| 2015/0102033 | A1 | 4/2015 | Banovic |
| 2015/0259493 | A1 | 9/2015 | Nederkoorn et al. |
| 2016/0114557 | A1 | 4/2016 | Raue et al. |
| 2018/0099798 | A1 | 4/2018 | Lehrter |
| 2018/0281260 | A1 | 10/2018 | Ben-Daat et al. |
| 2018/0281620 | A1 | 10/2018 | Ourabah et al. |
| 2020/0171786 | A1 | 6/2020 | Saniei et al. |
| 2020/0361184 | A1 | 11/2020 | Saniei et al. |
| 2020/0361185 | A1 | 11/2020 | Saniei et al. |
| 2022/0152996 | A1 | 5/2022 | Saniei et al. |

FOREIGN PATENT DOCUMENTS

| | | | |
|---|---|---|---|
| CZ | | 2015631 A3 | 2/2017 |
| DE | | 195 44 858 A1 | 4/1997 |
| EP | | 0 967 074 A2 | 12/1999 |
| WO | WO | 90/14945 A1 | 12/1990 |
| WO | WO | 01/49487 A1 | 7/2001 |
| WO | WO | 2007/118765 A1 | 10/2007 |
| WO | WO | 2011/044324 A2 | 4/2011 |
| WO | WO | 2014/074992 A2 | 5/2014 |
| WO | WO | 2017/210423 A2 | 12/2017 |

OTHER PUBLICATIONS

International Preliminary Report on Patentability for International Application No. PCT/US2020/033140 mailed Dec. 2, 2021.

[No Author Listed], Tappi T 489 om-15. Bending Resistance (Stiffness) of Paper and Paperboard (Taber-Type Tester in Basic Configuration). Techstreet Store. Jan. 2015. https://www.techstreet.com/standards/tappi-t-489-om-15?product_id=2000171 [last accessed Dec. 15, 2021].

[No Author Listed], Tappi T 538 om-16. Roughness of Paper and Paperboard (Sheffield Method). Techstreet Store. Jan. 2016. https://www.techstreet.com/standards/tappi-t-538-om-16?product_id=2000171 [last accessed Dec. 15, 2021].

Feng et al., High oxygen barrier multilayer EVOH/LDPE film/foam. J Appl Polym Sci. Jul. 10, 2018;135(26):46425. Abstract Only.

LIGHTWEIGHT POLYETHYLENE FILM FOR ASEPTIC PACKAGING APPLICATIONS AND THE PRODUCT RESULTING THEREFROM AND THE PROCESS OF MAKING THE SAME

RELATED APPLICATION

This application is a continuation of U.S. application Ser. No. 16/875,198, filed May 15, 2020, which claims priority to U.S. provisional patent application No. 62/849,329 filed on May 17, 2019, each of which is incorporated herein by reference in its entirety.

FIELD

This invention relates to a multilayer foam film of high density polyethylene (HDPE) which may be used for paper replacement applications in the aseptic packaging industry.

BACKGROUND

Paperboards consumption for packaging applications accounts for almost one-third of the total packaging market. For the direct food contact packaging, paper boards work safely with a barrier coating of some form. Conventionally, for the food packaging applications where the barrier properties are essential, the paper boards are paraffin wax coated or laminated with a polymer film, which is usually polyethylene. For the shelf-stable products that are stored at room temperature, and the packaging is done aseptically followed by hermetic sealing, oxygen barrier property is essential. The advent of paper-foil-plastic laminated containers, e.g., Tetrahedron in 1959, was an inflection point in packaging industries where it could be replaced with metal cans and glass containers. So, typically a layer of a metalized polymer film or aluminum film is incorporated in the structure of the paperboard. This can cause a significant recycling issue because the vast majority of the recycling sites are deficient in infrastructure that can provide a certain recycling technology. There has been cumulative popularity and interest for the sterilized and pasteurized products that are being packaged aseptically which eliminates refrigeration and prevents spoilage without using preservatives, for example, milk, baby foods, tomato products, broths, soups, vegetables, desserts, liquid egg, yogurt, dressings, etc. So, with the vast demand growth in food packaging in emerging markets, it would be desirable to produce a lightweight recyclable polymeric film that possesses surface quality for printing and preprinting shelf life, bending stiffness values comparable to the paperboards used in packaging, and sufficient barrier properties, all of which may be essential attributes for a product to replace the kinds of paperboard currently being used in packaging industries. Moreover, the mentioned product can address the wicking issues of coated paperboards.

To the best of applicant's knowledge, no recyclable lightweight film of polyethylene has been disclosed in the prior art to replace paperboards, coated paperboards, or laminated paperboards in food packaging industries that can possess all the aforementioned attributes such as high surface smoothness, high enough bending stiffness, high oxygen and moisture barrier properties, relatively low coefficient of friction on the skin layer, and which can address anti-static charge issues in the industrial packaging process.

SUMMARY

A recyclable lightweight multilayer film which may be used for aseptic packaging application is described herein.

The film can have a very smooth surface resulting in superior printing quality and high enough bending stiffness to replace paper boards.

In one aspect, a coextruded lightweight multilayer thermoplastic film is provided. The film comprises at least one foam layer including a plurality of cells wherein at least 10% of the cells are closed cells. The film further comprises two solid skin layers comprising HDP. The film further comprises one or more solid layer, comprising Ethylene vinyl alcohol (EVOH), each between the foam layer and solid layer, or between two of the solid layers, or between two of the foam layers. The film has an overall thickness equal to or greater than 8 mils, and a bending stiffness value of greater than 18 in Taber stiffness unit configuration according to TAPPI/ANSI T 489 om-15. The ratio of the mass per unit area (the mass of a unit area of the film in gram per meter-squared ($gr/m^2$)) over the stiffness value in Taber unit configuration is equal to or less than 13.

In another aspect, a coextruded lightweight multilayer thermoplastic film is provided. The film comprises at least one foam layer including a plurality of cells wherein at least 10% of the cells are closed cells. The film further comprises solid skin layers comprising HDPE. The film further comprises one or more solid layer, comprising Ethylene vinyl alcohol (EVOH), each between the foam layer and solid layer, or between two of the solid layers, or between two of the foam layers. The film has an overall thickness equal to or greater than 8 mils. The film has an average Sheffield smoothness of less than 40, according to TAPPI T 538. In some embodiments, more than 50% of the cells are closed cells.

The film can have a bending stiffness value of more than 18, in Taber stiffness unit configuration according to TAPPI/ANSI T 489 om-15, wherein the ratio of the mass per unit area (the mass of a unit area of the film in gram per meter-squared ($gr/m^2$)) over the stiffness value in Taber unit configuration is equal to or less than 13.

The film can have a surface with an average Sheffield smoothness, according to TAPPI T 538, of less than 25.

In some embodiments, the film can have an oxygen transmission rate of less than 0.65 cc/100 $in^2$/24 hr, or 10 $cc/m^2$/24 hr, according to ASTM D3985.

In some embodiments, the film can have a water vapor transmission rate of less than 0.05 gr/100 $in^2$/24 hr, according to ASTM E398-13.

Other aspects, embodiments, advantages, and features will become apparent from the following detailed description.

DETAILED DESCRIPTION

The singular forms "a," "an," and "the" include plural referents unless the context clearly dictates otherwise.

All ranges disclosed herein are inclusive of the recited endpoint and independently combinable (for example, the range of the bending stiffness in Taber unit configuration from 18 to 100" is inclusive of the endpoints, 18 and 100, and all the intermediate values. In the same context, for example, the overall thickness of greater than 8 mils is inclusive of the endpoint, 8 mils.)

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute value of the two endpoints. For example, the expression "from about 0.05 to about 15" also discloses the range "from 0.05 to 15".

As used herein, the term "lightweight" refers to the bulk density value of the products described herein being less than, or equal to, the density of their solid counterpart made from the associated base virgin resin, or the density of the associated base virgin resin. In a similar context, it refers to the bulk density value of the products described herein being less than, or at least equal to, the density of the paperboards with the same thickness or with the same weight values per unit area in gr/m$^2$. For example, bulk density values of the products of this invention can be less than 0.962 gr/cm$^3$ which is less than the density value of the associated base virgin resin of 0.962 gr/cm$^3$, or less than the bulk density value of 0.962 gr/cm$^3$ of its solid counterpart made from the associated base virgin resin.

The present disclosure relates to multilayer lightweight polyethylene foam film suitable to be used in all sorts of aseptic packaging; packaging of all sorts of oxygen-sensitive products, packaging of pasteurized products; packaging of dry food products such as biscuits, cookies, cereals, tea, coffee, sugar, flour, dry food mixes, chocolates, sugar confectionaries, pet food; packaging of frozen foods such as chilled foods and ice creams; packaging of cooked and precooked products and foods; backing board for fresh products such as vegetables, fruits, meat and fishes; packaging of baby foods; packaging of all kinds of desserts; packaging of liquid food and beverages such as broths, soups, juice drinks, milk and all sorts of products derived from milk, concentrates, all kinds of dressing, liquid eggs, tomato products; and packaging of all kinds of laundry detergents, shampoos, and body washes; making all sorts of pouches to include SUP, sachets, and packaging of pet foods.

The abovementioned examples do not put any limitation on the application of the products of this disclosure, and other applications may be possible.

One of the rationales behind the production of the synthetic lightweight films described herein and material selection for paperboard replacement is to address the recyclability, and to avoid the drawbacks of using the wax-coated paper boards, metalized films, and the films and sheets with an aluminum layer all of which are either not recyclable or cannot be recycled easily; although in reality the vast majority of the consumers intuitively believe that the abovementioned products, such as aseptically-packaged milk boxes or long-shelf life beverage boxes, are recyclable.

Herein a recyclable lightweight multilayer film is disclosed which, in some embodiments, comprises no less than five layers, e.g., seven layers, to be a replacement for paper boards that are being used in packaging industries, e.g., for aseptic packaging applications, and for direct and non-direct food contact packaging application. The film comprises high-density polyethylene (HDPE) wherein at least one layer, excluding the solid skin layers, has a cellular structure. In some embodiments, at least 10% of the cells are closed-cell; in some embodiments, more than 50% of the cells are closed cells; and, in some embodiments, more than 75% of the cells are closed cells. As used herein, a "closed cell" refers to a cell that has cell walls that completely surround the cell with no openings such that there is no interconnectivity to an adjacent cell. In some embodiments, the film comprises at least one solid layer containing EVOH, each of which located somewhere between the foam layer and solid layer, or between two of the solid layers.

In some embodiments, the mass concentration of the EVOH in every unit area of the multilayer film is less than 5 percent of the mass of the unit area of the film. In some embodiments, the mass concentration of the EVOH in every unit area of the multilayer film is less than 5 percent of the mass of the unit area of the film. In some other embodiments, the mass concentration of the EVOH in every unit area of the multilayer film is less than 2 percent of the mass of the unit area of the film.

Furthermore, the bending stiffness of the disclosed multilayer foamed film product could be improved over their solid counterparts to fulfill the property requirement in packaging industries. This could be done first and foremost by the inclusion of one or more cellular layer in the core of the multilayer film or between two solid skin layers, an accurate tune and alteration of the thickness of the cellular layer as well as fine-tuning the thickness of the solid skin layers. Generally, at the same thickness, a solid film of polyethylene can hardly possess bending stiffness values that paperboards can offer. This is due to the high degree of fiber alignment in paperboard which can significantly enhance the bending stiffness. In addition, it might be due to higher inherent stiffness of the individual fibers in the paperboard compared to the polymer chains in the polymeric film.

In general, HDPE owns a relatively low water vapor transmission rate of about 0.3-0.5 (g/100 in$^2$/24 hr). Embodiments of the multilayer foamed film products described herein can exhibit significantly higher moisture barrier properties compared to its solid counterparts with the same value of mass per unit area (in gram per meter squared). Also, embodiments of the multilayer foamed film products described herein can exhibit an enhanced oxygen barrier property.

Also, one of the issues in industrial-scale use of the polymeric packages, which can be a crucial factor in the efficient and cost-effective packaging process, is the ability of them to be de-nested quickly and freely. De-nesting problems are typically due to the friction and static charge. Embodiments of the multilayer foam films described herein can exhibit an anti-static and low friction behavior by manipulating the skin layer's structure and by the inclusion of appropriate amounts of slip agents, anti-block and anti-static agent into the solid skin layer.

One of the steps for making the disclosed product is how the bending stiffness may be controlled and enhanced by the inclusion and controlling the thickness of the core cellular layer, or the cellular layers between the two skin layers, and fine-tuning the solid skins, as well as how the surface smoothness has been enhanced significantly by adding a tiny amount of supercritical blowing agent. Moreover, how the unique structure and layer combination has resulted in a high barrier property without the inclusion of an aluminum or metalized barrier layer. That is, the film product may be free of any metal (e.g., aluminum) barrier layer.

In some embodiments, a blown film process may be used where the head pressure of the extruder can go high because of a very narrow gap that benefits the nucleation of cells in the foam layer. Using such a technique, the melt fracture should be avoided, and the resin should have excellent thermal stability and high enough melt strength. Typically, film manufacturers capitalize on a blend of a low-density polyethylene (LDPE) and a linear low-density polyethylene (LLDPE), while the blend is an immiscible blend in many cases, wherein LDPE can improve the processing ability and ductility while the LLDPE can enhance the modulus and strength. In some embodiments, all layers of the described multilayer film comprise HDPE and, in some cases, the polymeric material in one or more of these layers consists essentially of HDPE and, in some cases, the polymeric materials in at least one of the solid layers, excluding the solid skin layers, comprises EVOH. In one embodiment, at least one layer of the multilayer film can comprise LDPE.

In some embodiments, the multilayer film can be comprised of nine layers; in some embodiments, seven layers; and, in some embodiments, five layers. For example, a five-layer film may comprise a foam core layer (e.g., comprising HDPE) and at least two solid layers (e.g., comprising HDPE), each one on respective opposite sides of the core layer, and at least one solid layer (e.g., comprising EVOH), each one between the foam layer and solid skin layer.

In one case, a seven-layer foam film comprises a foam core layer (e.g., comprising HDPE) in the middle with two solid skin layers on each opposite side of the core layer, and at least one solid layer (e.g., comprising EVOH), each one between the foam layer and solid skin layer. In another case, a seven-layer foam film comprises a solid core layer (e.g., comprising EVOH) in the middle with two solid skin layers on each opposite side of the core layer, and at least one foam layer (e.g., comprising HDPE), each one between the solid core layer and the solid skin layer.

In another embodiment, a nine-layer foam film comprises a foam core layer (e.g., comprising HDPE) in the middle with two solid skin layers on each opposite side of the core layer, and at least one solid layer (e.g., comprising EVOH), each one between the foam layer and solid skin layer. In another embodiment, a nine-layer foam film comprises a solid core layer (e.g., comprising EVOH) in the middle with two solid skin layers on each opposite side of the core layer, and at least one foam layer (e.g., comprising HDPE), each one between the solid core layer and solid skin layer.

In another embodiment, the multilayer film, which can be five, seven, or nine layers, comprises at least one foam layer and two solid skin layers, and at least one solid layer (e.g., comprising EVOH). In another embodiment, the multilayer film, which can be five, seven, or nine layers, comprises at least one solid layer, comprising EVOH, each of which located between the foam layer and solid layer, or between the two solid layers.

In some embodiments, the multilayer film described herein comprises multiple layers, e.g., from 3 layers to 9 layers, comprising at least one foam layer and one or more solid layers containing EVOH. In some other embodiments, the multilayer film described herein comprises multiple layers, e.g., from 3 layers to 9 layers, comprising at least one solid layer containing EVOH.

It should be understood that other layer configurations may be possible.

In one embodiment, the process to produce the described multilayer films may utilize a very small and precise amount of supercritical gas, for example, below 0.1 wt %, as a processing aid and blowing agent. In some embodiments, other gas concentrations, e.g., more than 0.1 percent by weight maybe possible. Such supercritical gas may be injected into the molten polymer at a high pressure, for example, greater than 34 bar, inside an efficient and effectual mixer, e.g., cavity transfer mixer, as an extension to the extruder's barrel. The supercritical blowing agent used in the process can be either nitrogen, carbon dioxide, or a mixture of nitrogen and carbon dioxide. In some embodiments, the supercritical blowing agent can be introduced inside the mixing section of the extruder at the injection pressure greater than or equal to 34 bar; in some cases, greater than or equal to 70 bar; in some cases, greater than or equal to 240 bar, and, in some cases, greater than or equal to 380 bar. The temperature of the mixer could be accurately controlled within ±1° C. The inclusion of a tiny amount of gas can offer a few important advantages in the process and, for example, blown film extrusion processes. For example, the gas can reduce the back pressure which allows processing at higher throughput and can delay any bubble instability. Therefore, melt fracture could be reduced significantly. Also, the gas can enhance the processing ability of the HDPE, and to serve as a physical blowing agent with the presence of a nucleating agent in the layer that has a cellular structure. The addition of the physical blowing agent can depress the development of melt fracture due to the viscosity manipulation of the melt which may result in high surface smoothness. Hence the printing quality on the film can be improved significantly.

In general, conventional polymer processing equipment may be used to produce the films described herein. In some cases, for example, the film can be produced by the blown film process using an annular die with a die gap from 0.45 to 1.3 mm and a blow-up ratio ranging from 1.5:1 to 3.5:1. Higher blow-up ratios might result in a more balanced MD/TD (machine direction/transverse direction) orientation, which improves overall film toughness. The die geometry and specification may be manufactured according to, for example, the patent application US 2012/0228793 A1, which is incorporated by reference herein in its entirety.

The majority of the conventional PE blown films are processed using a PE blend comprising LDPE for enhancing bubble stability. Almost all the HDPE films are made in a high stock blown film process; otherwise, the tear strength of the HDPE film deteriorates significantly. As described above, in embodiments of the methods are used for producing the multi-layer films, a supercritical gas may be injected into the melt at a precisely controlled rate, inside a transfer mixer, before entering the annular die. This unit could be controlled as a separate temperature zone with an accuracy of ±1° C. and a gas injection pressure variation below 1%. The plasticization effect of the gas can result in a viscosity change of the molten resin which would enhance the processing ability of the resin inside the annular die at a lower temperature compared to the processing temperature which is being used conventionally. Hence, a relatively stable bubble can be made inside the pocket. Then, because of the overall high specific heat capacity of polyethylene, the transverse stretch of the bubble can be delayed until the film becomes cooler, which may further enhance the bubble stability and the frost line height. This also might be beneficial in manipulating the crystallization kinetics of the skin layers to improve a few other physio-mechanical properties. The higher degree of crystallization in the skin might lower the coefficient of friction on the skin layers.

In some embodiments, the multilayer foam films described herein can be produced by the blown film process, cast film process, or other suitable methods.

In some embodiments, the polymer composition of each layer comprises some apt amounts of other additives, such as pigments, slip agents, antistatic agents, UV stabilizers, antioxidants, nucleating agents, clarifying agents, or maleic anhydride. The foam layer optionally may contain 0.05 to 15 percent by weight of an inorganic additive, an organic additive or a mixture of an inorganic and an organic additive as a nucleating agent. For example, the foam layer may contain up to about 15% by weight of talc as a nucleating agent. In some embodiments, at least one layer may include a clarifying agent at less than 1 percent by weight, such as less than 0.5 percent by weight, such as less than 0.1 percent by weight, such as less than 0.05 percent by weight. In some cases, at least one layer of the film may contain up to about 35 wt % of calcium carbonates.

In some embodiments, at least one layer of the film described herein comprise less than 5 percent by weight maleic anhydride, for example, less than about 2 percent by weight.

In some cases, multilayer foam film can be comprised of two solid skin layers wherein one of the skin layers contains an apt amount of black pigments, for example, less than 1 percent by weight, and the other solid skin layer contains apt amounts of white pigments, for example, less than 1 percent by weight. In some other embodiments, both solid skin layers comprise an apt amount of white pigments.

In another case, the solid skin layers of the multilayer foam film comprise less than 0.5 percent by weight of an anti-blocking agent and/or less than 0.2 percent by weight of an anti-static agent.

In one embodiment, the multilayer foamed film has at least one solid skin layer with a static coefficient of friction value of less than 0.4, such as less than 0.38. In another embodiment, the film has at least one solid skin layer with a dynamic coefficient of friction value of less than 0.3.

The described multilayer film, comprising at least one foam layer, may have sets of significantly improved physiomechanical properties compared to known foamed film articles as in particular the bending stiffness value of greater than 18, in some cases greater than 20, and in some cases, greater than 25, all in Taber stiffness unit configuration, according to TAPPI/ANSI T 489 om-15, wherein the ratio of the mass per unit area (the mass of a unit area of the film in gram per meter-squared ($gr/m^2$)) over the stiffness value in Taber unit configuration is equal to or less than 13; in some cases, less than 11, and, in some cases, less than 10. In an embodiment, the film can have a Taber bending stiffness value of less than 280, according to TAPPI/ANSI T 489 om-15.

The described films can have a surface with an average Sheffield smoothness, according to TAPPI T 538, of less than 100. In some embodiments, the film may have an average Sheffield smoothness of less than 50; in some cases, less than 40; in some cases, less than 30; and, in some cases, less than 15.

The multilayer foam film can have an overall thickness of greater than 8 mils, in some cases, greater than 10 mils, in some cases, greater than 13 mils, and in some cases greater than 15 mils.

In some embodiments, the lightweight film of this invention has a bulk density less than 1 $gr/cm^3$; in some cases, less than 0.962 $gr/cm^3$; in some cases, less than 0.94 $gr/cm^3$; in some cases, less than 0.9 $gr/cm^3$; in some cases, less than 0.85 $gr/cm^3$; and in some cases, less than 0.8 $gr/cm^3$.

In some embodiments, the foam layer of the disclosed film has a far better cellular morphology compared to the known films. For example, the foam layers of the disclosed films can have uniformly distributed cells, for example with a closed-cell morphology, an average cell size of about 10-250 μm, an average cell density with respect to the un-foamed polymer volume of about $10^2$-$10^9$ cells/$cm^3$, and an expansion ratio of the foamed layer from 1 to 9. In some cases, the foam layer comprises at least 10% closed cells and, in some cases, more than 50% closed cells. In one embodiment, the foam layer has a substantially entirely closed-cell morphology (e.g., greater than 95% closed cells).

In some embodiments, the multilayer foam film comprises at least one layer containing the PE/EVOH blend. In some embodiments, the multilayer foam film described herein comprises at least one layer, excluding the solid skin layers, containing from about 30 to 50 percent by weight of EVOH, and less than 5 percent by weight maleic anhydride, e.g., 2 percent by weight. In some embodiments, the overall mass concentration of the EVOH in a unit area of the film does not exceed 5 percent of the mass of the unit area of the film.

The films described herein can have a water vapor transmission rate of less than 0.05 $gr/100$ $in^2$/24 hr, according to ASTM E398-13. In one case, the water vapor transmission rate of the film is less than 0.1 $gr/100$ $in^2$/24 hr.

In some embodiments, the described film can have an oxygen transmission rate of less than 0.65 cc/100 $in^2$/24 hr, or 10 cc/$m^2$/24 hr, according to ASTM D3985. In one case, the described film can have an oxygen transmission rate of less than 0.32 cc/100 $in^2$/24 hr, or 5 cc/$m^2$/24 hr, according to ASTM D3985.

In some embodiments, the described film comprises at least one layer containing a resin with an oxygen transmission rate value of less than 0.65 cc/100 $in^2$/24 hr, according to ASTM D3985. In another embodiment, the described film comprises at least one layer, excluding the solid skin layers, containing ethylene vinyl alcohol (EVOH).

In an exemplary embodiment, the multilayer foam film, e.g., five-layer foam film, has at least one solid skin layer with a static coefficient of friction value of less than 0.4, and/or less than 0.38. In another embodiment, the film, e.g., five-layer foam film, has at least one solid skin layer with a dynamic coefficient of friction value of less than 0.3.

In some embodiments, various thermoplastics can be used in at least one layer of the multilayer foam film and in the blown film process such as polyethylene (PE), polypropylene (PP), polyethylene terephthalate (PET), ethylene vinyl acetate (EVA), ethylene vinyl alcohol (EVOH), polyvinyl chloride (PVC), Polyvinylidene chloride (PVDC), polyamide (PA), LLDPE copolymer which include an α-olefin co-monomer such as butene, hexene, or octene; any of the resins known as TPE family such as, but not limited to, propylene-ethylene copolymer, thermoplastic olefin (TPO), and thermoplastic polyurethane (TPU).

In another embodiment, at least one layer, (e.g., excluding the outer skin layers), of the film may comprise LDPE, PP, PA, EVOH, EVA, or PVOH. The following examples demonstrate the process of the present disclosure. The examples are only demonstrative and are intended to put no limit on the disclosure with regards to the materials, conditions, or the processing parameters set forth herein.

Examples

All of the products resulting from the examples below were tested and characterized in terms of bending stiffness, surface smoothness, oxygen transmission rate, water vapor transmission rate, and density. To characterize the bending stiffness of the film, a TABER Stiffness Tester, Model 150-E from Taber Industries, was used. The smoothness of the products was evaluated using a Gurley™ 4340 Automatic Densometer & Smoothness Tester. The Oxygen Transmission Rate (OTR) of the products was measured using OX-TRAN 1/50 tester from AMETEK MOCON, according to ASTM D3985. The Water Vapor Transmission Rate (WVTR) of the samples was measured using a PERMATRAN-W Model 1/50 G+ tester from AMETEK MOCON, according to ASTM E398-13.

Example 1: Samples of multilayer HDPE film (seven layers) were produced using a 7 layer blown film line from Reifenhauser Extrusion System equipped with internal bubble cooling system, gauge control, mass throughput control, and layer thickness control, consisting seven extruders including two 55 mm Extruders denoted as "A" and "G", for the skins, two 65 mm Extruders denoted as "B" and "F", and three 35 mm extruders denoted as "C", "D", and "E. Both 65 mm extruders were equipped with supercritical gas injection unit, capable of injecting nitrogen, carbon dioxide, or a mixture of both, as well as two 65 mm MuCell Transfer Mixer (MTM), all from MuCell Extrusion LLC. All the films were produced by the blown film process using an annular die with a die gap ranging from 0.7 to 1.2 mm and a blow-up ratio ranging from 2.8:1 to 3.5:1. The lip of the annular die was boron nitride coated.

Table 1 contains the processing data, as well as the characterization results of the products, which were made, as non-limiting examples to elucidate this invention. The samples were produced with high-density polyethylene ELITE 5960 from Dow Chemical Company, having the melt index of 0.85 dg/min and the density of 0.962 gr/cm$^3$. In all samples, where required, the additives, e.g., color pigments, were added in the form of a masterbatch with LDPE carrier. Obviously, the additives can be compounded in an HDPE carrier. In a few samples, a minor fraction of the LDPE 1321 from Dow Chemical Company with the melt index of 0.25 dg/min and the density of 0.921 gr/cm$^3$ was used. The calcium carbonate and talc were prepared and introduced as a highly filled masterbatch of, respectively, 80 wt % filled calcium carbonate and 70 wt % filled talc within the HDPE as the base carrier resin. All of the tie layers comprise ADM ER adhesive resin, which is anhydride grafted polyolefin. In this example, the middle layer comprises Ethylene vinyl alcohol (EVOH) with an ethylene content of 32%.

All the samples were coextruded with a total throughput of 300 to 340 kg/hr, as it is listed in table 1. The temperature of the mixing section, wherein the supercritical gas was injected, was kept at 184° C. for all the samples. Supercritical nitrogen was used as a physical blowing agent and was injected into the MuCell Transfer Mixer (MTM) at the concentration from 0.01 wt % to 0.07 wt %, very accurately, into the molten polymer. The temperatures of the extruders' zones were set according to the conventional processing suggested in the datasheet of the materials.

Sample 2 and 3 are the foam versions of the solid sample 1 with the same basic weight of 342 gr/m$^2$, which have 40% and 45% less density compared to the solid sample 1, respectively.

As it is listed in table 1, sample 3 shows 190% higher bending stiffness value compared to its solid counterpart. Sample 5 and 6 are the foam versions of sample 4 with the same basic weight of about 390 gr/m$^2$, which have 37% and 39% less density compared to the solid sample 4. Samples 5 and 6 show 140% and 160% higher bending stiffness values compared to their solid counterpart, respectively. Sample 6 possesses the surface smoothness value of about 17.5, in Sheffield, which is comparable to sample 4. Both samples 5 and 6 show an oxygen transmission rate below 1.5 cc/m$^2$/day.

Samples 8, 9, 10, and 11 are the foam version of sample 7 with a similar basic weight of about 240 g/m$^2$, which has about 20% to 30% less density. Samples 9 and 10 possess 140% and 190% higher bending stiffness compared to their solid counterpart. Although samples 8 and 9 have much thinner (almost half) middle layer compared to sample 10, they show an oxygen transmission rate in the same range all less than 3 cc/m$^2$/day. Also, samples 8 and 9 have a surface smoothness value of below 10, in Sheffield, and comparable to their solid counterpart.

Moreover, almost all the samples 1 to 11 possess a water vapor transmission rate of less than 1 gr/m$^2$/day.

TABLE 1

| Sample | 1 | | | | | | | 2 | | | | | | |
|---|---|---|---|---|---|---|---|---|---|---|---|---|---|---|
| Code | Solid 330 | | | | | | | #1-0.055N2-330 | | | | | | |
| ID | C2-22-01 | | | | | | | C2-22-02 | | | | | | |
| Density (gr/cm$^3$) | 1.284 | | | | | | | 0.796 | | | | | | |
| Thickness (um) | 300 | | | | | | | 430 | | | | | | |
| Basic weight (gr/m$^2$) | 342.3 | | | | | | | 342.3 | | | | | | |
| Total Throughput | 300 | | | | | | | 300 | | | | | | |
| Layers | A | B | C | D | E | F | G | A | B | C | D | E | F | G |
| HDPE (wt %) | 70 | 50 | | | | 50 | 70 | 70 | 50 | | | | 50 | 70 |
| 80% CaCO3 filled PE (wt %) | | 20 | | | | 20 | | | 20 | | | | 20 | |
| mPE (wt %) | | | 70 | | 70 | | | | | 70 | | 70 | | |
| Adhesive (wt %) | | | 30 | | 30 | | | | | 30 | | 30 | | |
| EVOH (wt %) | | | | 100 | | | | | | | 100 | | | |
| 70% talc filled HDPE (wt %) | 25 | | | | | 25 | 25 | | | | | | | 25 |
| 64% talc filled PE (wt %) | | 20 | | | | 20 | | | 20 | | | | 20 | |
| LDPE (wt %) | 5 | 10 | | | | 10 | 5 | 5 | 10 | | | | 10 | 5 |
| SC-N2 (%) | | | | | | | | 0.055 | | | | | 0.055 | |
| Layer Thickness (um) | 55 | 82 | 8 | 10 | 8 | 82 | 55 | 55 | 147 | 8 | 10 | 8 | 147 | 55 |
| Throughput (kg/hr) | 53.2 | 85.2 | 6.4 | 10.4 | 6.4 | 85.2 | 53.2 | 53.2 | 85.2 | 6.4 | 10.4 | 6.4 | 85.2 | 53.2 |
| Bending Stiffness (Taber) | 38.4 | | | | | | | | | | | | | |
| Smoothness (Sheffield) | 14.2 | | | | | | | | | | | | | |
| OTR (cc/m2/day) | 1.33 | | | | | | | | | | | | | |
| WVTR (gr/m2/day) | <1 | | | | | | | | | | | | | |

| Sample | 3 | 4 |
|---|---|---|
| Code | #2-0.065N2-330 | Solid 390 |
| ID | C2-22-03 | C2-22-04 |
| Density (gr/cm$^3$) | 0.712 | 1.19 |
| Thickness (um) | 480 | 330 |
| Basic weight (gr/m$^2$) | 342.3 | 392.6 |
| Total Throughput | 300 | 300 |

TABLE 1-continued

| Layers | A | B | C | D | E | F | G | A | B | C | D | E | F | G |
|---|---|---|---|---|---|---|---|---|---|---|---|---|---|---|
| HDPE (wt %) | 70 | 50 |  |  |  | 50 | 70 | 65 | 50 |  |  |  | 50 | 70 |
| 80% CaCO3 filled PE (wt %) |  | 20 |  |  |  | 20 |  |  | 30 |  |  |  | 30 |  |
| mPE (wt %) |  |  | 70 |  | 70 |  |  |  |  | 70 |  | 70 |  |  |
| Adhesive (wt %) |  |  | 30 |  | 30 |  |  |  |  | 30 |  | 30 |  |  |
| EVOH (wt %) |  |  |  | 100 |  |  |  |  |  |  | 100 |  |  |  |
| 70% talc filled HDPE | 25 |  |  |  |  | 25 | 25 |  |  |  |  |  |  | 25 |
| 64% talc filled PE (wt %) |  | 20 |  |  |  | 20 |  |  | 20 |  |  |  | 20 |  |
| LDPE (wt %) | 5 | 10 |  |  |  | 10 | 5 | 10 |  |  |  |  |  | 5 |
| SC-N2 (%) |  | 0.065 |  |  |  | 0.065 |  |  |  |  |  |  |  |  |
| Layer Thickness (um) | 55 | 172 | 8 | 10 | 8 | 172 | 55 | 55 | 90 | 15 | 10 | 15 | 90 | 55 |
| Throughput (kg/hr) | 53.2 | 85.2 | 6.4 | 10.4 | 6.4 | 85.2 | 53.2 | 47.8 | 87.8 | 10.5 | 9.1 | 10.5 | 87.8 | 46.4 |
| Bending Stiffness (Taber) |  |  |  | 76.2 |  |  |  |  |  |  | 50.5 |  |  |  |
| Smoothness (Sheffield) |  |  |  | 117.2 |  |  |  |  |  |  | 16.6 |  |  |  |
| OTR (cc/m2/day) |  |  |  | 4.17 to 34.2 |  |  |  |  |  |  | 1.18 |  |  |  |
| WVTR(gr/m2/day) |  |  |  | 0.93 |  |  |  |  |  |  | <1 |  |  |  |

| Sample | 5 | 6 |
|---|---|---|
| Code | #4-0065N@-390 | #6 |
| ID | C2-22-05 | C2-22-06 |
| Density (gr/cm³) | 0.742 | 0.718 |
| Thickness (um) | 535 | 540 |
| Basic weight (gr/m²) | 396.7 | 387.9 |
| Total Throughput | 340 | 340 |

| Layers | A | B | C | D | E | F | G | A | B | C | D | E | F | G |
|---|---|---|---|---|---|---|---|---|---|---|---|---|---|---|
| HDPE (wt %) | 65 | 50 |  |  |  | 50 | 70 | 65 |  |  |  |  |  | 65 |
| 80% CaCO3 filled PE (wt %) |  | 30 |  |  |  | 30 |  |  | 20 |  |  |  | 20 |  |
| mPE (wt %) |  |  | 70 |  | 70 |  |  |  |  | 70 |  | 70 |  |  |
| Adhesive (wt %) |  |  | 30 |  | 30 |  |  |  |  | 30 |  | 30 |  |  |
| EVOH (wt %) |  |  |  | 100 |  |  |  |  |  |  | 100 |  |  |  |
| 70% talc filled HDPE | 25 |  |  |  |  | 25 | 30 |  |  |  |  |  |  | 30 |
| 64% talc filled PE (wt %) |  | 20 |  |  |  | 20 |  |  | 20 |  |  |  | 20 |  |
| LDPE (wt %) | 10 |  |  |  |  | 5 | 5 | 60 |  |  |  |  | 60 | 5 |
| SC-N2 (%) |  | 0.065 |  |  |  | 0.065 |  |  | 0.065 |  |  |  |  | 0.065 |
| Layer Thickness (um) | 55 | 193 | 15 | 10 | 15 | 193 | 55 | 55 | 97.5 | 15 | 10 | 15 | 97.5 | 55 |
| Throughput (kg/hr) | 53.6 | 100 | 11.8 | 10.2 | 11.8 | 100 | 52 | 54.4 | 98.3 | 12.1 | 10.4 | 12.1 | 98.3 | 54.4 |
| Bending Stiffness (Taber) |  |  |  | 70.5 |  |  |  |  |  |  | 80.5 |  |  |  |
| Smoothness (Sheffield) |  |  |  | 26.7 |  |  |  |  |  |  | 17.5 |  |  |  |
| OTR (cc/m2/day) |  |  |  | 1.45 |  |  |  |  |  |  | <1.5 |  |  |  |
| WVTR(gr/m2/day) |  |  |  | <1 |  |  |  |  |  |  | <1 |  |  |  |

| Sample | 7 | 8 |
|---|---|---|
| Code | Solid 243 | #1A-F Foam |
| ID | C2-18-01 | C2-18-02 |
| Density (gr/cm³) | 1.174 | 0.959 |
| Thickness (um) | 207 | 250 |
| Basic weight (gr/m²) | 243.1 | 239.8 |
| Total Throughput | 340 | 343.5 |

| Layers | A | B | C | D | E | F | G | A | B | C | D | E | F | G |
|---|---|---|---|---|---|---|---|---|---|---|---|---|---|---|
| HDPE (wt %) | 65 | 30 |  |  |  | 30 | 65 | 65 | 20 |  |  |  | 20 | 65 |
| 80% CaCO3 filled PE (wt %) |  | 30 |  |  |  | 30 |  |  | 30 |  |  |  | 30 |  |
| mPE (wt %) |  |  | 70 |  | 70 |  |  |  |  | 70 |  | 70 |  |  |
| Adhesive (wt %) |  |  | 30 |  | 30 |  |  |  |  | 30 |  | 30 |  |  |
| EVOH (wt %) |  |  |  | 100 |  |  |  |  |  |  | 100 |  |  |  |
| 70% talc filled HDPE | 30 |  |  |  |  | 30 | 30 |  |  |  |  |  |  | 30 |
| 64% talc filled PE (wt %) |  | 20 |  |  |  | 20 |  |  | 20 |  |  |  | 20 |  |
| LDPE (wt %) | 5 | 20 |  |  |  | 20 | 5 | 5 | 30 |  |  |  | 30 | 5 |
| SC-N2 (%) |  |  |  |  |  |  |  |  |  |  |  |  |  | 0.065 |
| Layer Thickness (um) | 45 | 46.5 | 8 | 8 | 8 | 46.5 | 45 | 44.7 | 46.2 | 9.9 | 4 | 9.8 | 90.6 | 44.8 |
| Throughput (kg/hr) | 71.1 | 82 | 10.3 | 13.3 | 10.3 | 82 | 71.1 | 72.3 | 82.9 | 13 | 6.8 | 12.9 | 83.1 | 72.4 |
| Bending Stiffness (Taber) |  |  |  | 15.7 |  |  |  |  |  |  | 15.8 |  |  |  |
| Smoothness (Sheffield) |  |  |  | 7 |  |  |  |  |  |  | 7.3 |  |  |  |
| OTR (cc/m2/day) |  |  |  | 1.63 |  |  |  |  |  |  | 2.47 |  |  |  |
| WVTR (gr/m2/day) |  |  |  | <1 |  |  |  |  |  |  | 0.694 |  |  |  |

TABLE 1-continued

| Sample | 9 | | | | | | | 10 | | | | |
|---|---|---|---|---|---|---|---|---|---|---|---|---|
| Code | #1B, F&B Foam | | | | | | | #2 | | | | |
| ID | C2-18-03 | | | | | | | C2-18-04 | | | | |
| Density (gr/cm$^3$) | 0.856 | | | | | | | 0.842 | | | | |
| Thickness (um) | 280 | | | | | | | 300 | | | | |
| Basic weight (gr/m$^2$) | 239.6 | | | | | | | 252.7 | | | | |
| Total Throughput | 342.8 | | | | | | | 340 | | | | |
| Layers | A | B | C | D | E | F | G | A | B | C | D | E |
| HDPE (wt %) | 65 | 20 | | | | 20 | 65 | 65 | 50 | | | |
| 80% CaCO3 filled PE (wt %) | | 30 | | | | 30 | | | 30 | | | |
| mPE (wt %) | | | 70 | | 70 | | | | | 70 | | 70 |
| Adhesive (wt %) | | | 30 | | 30 | | | | | 30 | | 30 |
| EVOH (wt %) | | | | 100 | | | | | | | 100 | |
| 70% talc filled HDPE (wt %) | 30 | | | | | 30 | 30 | | | | | |
| 64% talc filled PE (wt %) | | 20 | | | | 20 | | | 20 | | | |
| LDPE (wt %) | 5 | 30 | | | | 30 | 5 | 5 | | | | |
| SC-N2 (%) | | 0.065 | | | | 0.065 | | | 0.065 | | | |
| Layer Thickness (um) | 44.4 | 83.5 | 9.9 | 4.1 | 9.8 | 83.5 | 44.8 | 45 | 89.7 | 10.5 | 10 | 10.2 |
| Throughput (kg/hr) | 71.7 | 82.8 | 13 | 7 | 12.9 | 83 | 72.4 | 68.4 | 80.8 | 13 | 16 | 12.6 |
| Bending Stiffness (Taber) | 21.8 | | | | | | | 30.1 | | | | |
| Smoothness (Sheffield) | 5.6 | | | | | | | 31.7 | | | | |
| OTR (cc/m2/day) | 2.76 | | | | | | | 3.09 | | | | |
| WVTR (gr/m2/day) | 0.739 | | | | | | | 1.07 | | | | |

| Sample | 10 | | 11 | | | | | | |
|---|---|---|---|---|---|---|---|---|---|
| Code | #2 | | #3 | | | | | | |
| ID | C2-18-04 | | C2-18-05 | | | | | | |
| Density (gr/cm$^3$) | 0.842 | | 0.81 | | | | | | |
| Thickness (um) | 300 | | 300 | | | | | | |
| Basic weight (gr/m$^2$) | 252.7 | | 243.1 | | | | | | |
| Total Throughput | 340 | | 340 | | | | | | |
| Layers | F | G | A | B | C | D | E | F | G |
| HDPE (wt %) | 50 | 65 | 65 | 50 | | | | 50 | 65 |
| 80% CaCO3 filled PE (wt %) | 30 | | | 30 | | | | 30 | |
| mPE (wt %) | | | | | 70 | | 70 | | |
| Adhesive (wt %) | | | | | 30 | | 30 | | |
| EVOH (wt %) | | | | | | 100 | | | |
| 70% talc filled HDPE (wt %) | | 30 | 30 | | | | | | 30 |
| 64% talc filled PE (wt %) | 20 | | | 20 | | | | 20 | |
| LDPE (wt %) | | 5 | 5 | | | | | | 5 |
| SC-N2 (%) | 0.065 | | | 0.065 | | | | 0.065 | |
| Layer Thickness (um) | 89.7 | 45 | 45 | 93 | 8 | 8 | 8 | 93 | 45 |
| Throughput (kg/hr) | 80.8 | 68.4 | 71.1 | 82 | 10.3 | 13.3 | 10.3 | 82 | 71.1 |
| Bending Stiffness (Taber) | 30.1 | | | | | | | | |
| Smoothness (Sheffield) | 31.7 | | | | | | | | |
| OTR (cc/m2/day) | 3.09 | | | | | | | | |
| WVTR (gr/m2/day) | 1.07 | | | | | | | | |

Example 2: Samples of multilayer HDPE film (three layers) were produced using a blown film line from Windmoeller & Hoelscher Corporation comprising one 105 mm main extruder and two identical 75 mm co-extruders. The core extruder was equipped with a supercritical gas injection unit, capable of injecting nitrogen or carbon dioxide, and a 120 mm MuCell Transfer Mixer, both from MuCell Extrusion LLC. All the films were produced by the blown film process using an annular die with a die gap ranging from 0.45 to 1.3 mm and a blow-up ratio ranging from 2.8:1 to 3.5:1. The lip of the annular die was boron nitride coated.

Table 2 contains the characterization results of the products (samples 12 to 15) were made, as non-limiting examples to elucidate on some embodiments of this invention. The samples were produced with high-density polyethylene ELITE 5960 from Dow Chemical Company, having the melt index of 0.85 dg/min and the density of 0.962 gr/cm$^3$. The calcium carbonate and talc were prepared and introduced as a highly filled masterbatch of, respectively, 80 wt % filled calcium carbonate and 70 wt % filled talc within the HDPE as the base carrier resin. The foamed core layer of all samples contains talc as the cell nucleating agent.

All the samples were coextruded with the total throughput of about 260 to 290 kg/hr, as it is listed in table 2. The temperature of the mixing section, wherein the supercritical gas was injected, was kept at 190° C. for all the samples 12 to 15. Supercritical nitrogen was used as a physical blowing agent and was injected into the MuCell Transfer Mixer (MTM) at the concentration from 0.011 wt % to 0.02 wt %, very accurately, into the molten polymer.

Sample 15 is the solid counterpart of samples 12, 13, and 14 which have about 18% to 25% less density compared to sample 15. Sample 15 showed an oxygen transmission rate of less than 1.4 cc/m$^2$/day. All the samples exhibit a water vapor transmission rate of less than 1, as well as a surface smoothness value of less than 10, in Sheffield.

TABLE 2

| Sample | 12 | | | 13 | | | 14 | | | 15 | | |
|---|---|---|---|---|---|---|---|---|---|---|---|---|
| ID | C2-14-1 | | | C2-14-2 | | | C2-14-4 | | | C2-14-5 | | |
| Density (gr/cm$^3$) | 0.9 | | | 0.88 | | | 0.826 | | | 1.104 | | |
| Thickness (um) | 121 | | | 125 | | | 155 | | | 104.5 | | |
| Basic weight (gr/m$^2$) | 110 | | | 110 | | | 128 | | | 110 | | |
| Total Throughput | 287.2 | | | 261 | | | 261 | | | 261 | | |
| Layers | A | B | C | A | B | C | A | B | C | A | B | C |
| HDPE (wt %) | 68 | 80 | 98 | 68 | 80 | 98 | 68 | 35 | 98 | 68 | 35 | 98 |
| 64% talc filled PE (wt %) | | 18 | | | 18 | | | 18 | | | 18 | |
| 70% talc filled HDPE (wt %) | 30 | | | 30 | | | 30 | | | 30 | | |
| Maleic anhydride (wt %) | | 2 | | | 2 | | | 2 | | | 2 | |
| EVOH (wt %) | | | | | | | | 45 | | | 45 | |
| LDPE (wt %) | 2 | | 2 | 2 | | 2 | 2 | | 2 | 2 | | 2 |
| SC-N2 (%) | 0.01 | | | 0.01 | | | 0.01 | | | <<0.011 | | |
| Layer Thickness (um) | 31.5 | 49.1 | 40.4 | 24.7 | 37.2 | 44.5 | 29 | 73.7 | 52.3 | 24.9 | 34.7 | 44.9 |
| Throughput (kg/hr) | 91.5 | 92.2 | 104 | 65.3 | 92.2 | 104 | 65.3 | 92.2 | 104 | 65.3 | 92.2 | 104 |
| Smoothness (Sheffield) | <10 | | | <10 | | | <10 | | | <10 | | |
| OTR (cc/m2/day) | 239 | | | 276 | | | 6.64 | | | 1.38 | | |
| WVTR (gr/m2/day) | 0.571 | | | 0.581 | | | 0.847 | | | 0.86 | | |

The invention claimed is:

1. A multilayer product comprising:
a foam layer including a plurality of cells, wherein at least 10% of the cells are closed cells, and
a plurality of solid layers on each side of the foam layer, wherein one of the solid layers on each side of the foam layer comprises HDPE, and
a solid layer comprising ethylene vinyl alcohol (EVOH) between the foam layer and one of the solid layers comprising HDPE,
wherein the product has an overall thickness equal to or greater than 8 mils, and a bending stiffness value of greater than 18 in Taber stiffness unit configuration according to TAPPI/ANSI T 489 om-15, and the ratio of the mass per unit area (the mass of a unit area of the product in gram per meter-squared (gr/m$^2$)) over the stiffness value in Taber unit configuration is equal to or less than 13.

2. The product of claim 1, wherein the foam layer comprises HDPE.

3. The product of claim 1, wherein at least 50% of the cells of the foam layer are closed cells.

4. The product of claim 1, wherein the foam layer has an average cell size of 10 to 100 μm.

5. The product of claim 1, wherein the outermost layers on each side of the product comprise HDPE.

6. The product of claim 1, further comprising a second foam layer.

7. The product of claim 1, further comprising a second solid layer comprising ethylene vinyl alcohol (EVOH).

8. The product of claim 1, wherein the product has a bending stiffness value of greater than 25 in Taber stiffness unit configuration according to TAPPI/ANSI T 489 om-15.

9. The product of claim 1, wherein the product has an average Sheffield smoothness of less than 40, according to TAPPI T 538.

10. The product of claim 1, wherein the product has a water vapor transmission rate of less than 1 gr/m$^2$/24 hr according to ASTM E398-13.

11. The product of claim 1, wherein the product has an oxygen transmission rate of less than 10 cc/m$^2$/24 hr according to ASTM D3985.

12. The product of claim 1, wherein the product comprises nine layers.

13. A multilayer product comprising:
a foam layer including a plurality of cells, wherein at least 10% of the cells are closed cells, and
a plurality of solid layers on each side of the foam layer, wherein one of the solid layers on each side of the foam layer comprises HDPE, and
a solid layer comprising ethylene vinyl alcohol (EVOH) between the foam layer and one of the solid layers comprising HDPE,
wherein the product has an overall thickness equal to or greater than 8 mils, and an average Sheffield smoothness of less than 40, according to TAPPI T 538.

14. The product of claim 13, wherein the foam layer comprises HDPE.

15. The product of claim 5, wherein the foam layer has an average cell size of 10 to 100 μm.

16. The product of claim 13, wherein the outermost layers on each side of the product comprise HDPE.

17. The product of claim 13, wherein the product has a bending stiffness value of greater than 25 in Taber stiffness unit configuration according to TAPPI/ANSI T 489 om-15.

18. The product of claim 13, wherein the product has an average Sheffield smoothness of less than 15, according to TAPPI T 538.

19. The product of claim 13, wherein the product has a water vapor transmission rate of less than 1 gr/m$^2$/24 hr according to ASTM E398-13.

20. The product of claim 13, wherein the product comprises nine layers.

* * * * *